United States Patent
Apodaca (10) Patent No.: US 10,134,314 B2
(45) Date of Patent: Nov. 20, 2018

(54) REDUCING POWER FOR 3D WORKLOADS

(75) Inventor: Michael Apodaca, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 207 days.

(21) Appl. No.: 13/976,012

(22) PCT Filed: Nov. 30, 2011

(86) PCT No.: PCT/US2011/062612
§ 371 (c)(1),
(2), (4) Date: Jun. 25, 2013

(87) PCT Pub. No.: WO2013/081600
PCT Pub. Date: Jun. 6, 2013

(65) Prior Publication Data
US 2013/0271474 A1    Oct. 17, 2013

(51) Int. Cl.
*G06F 15/00* (2006.01)
*G09G 3/00* (2006.01)
*G06F 1/32* (2006.01)

(52) U.S. Cl.
CPC .......... *G09G 3/001* (2013.01); *G06F 1/3212* (2013.01); *G06F 1/3265* (2013.01); *Y02D 10/153* (2018.01); *Y02D 10/174* (2018.01)

(58) Field of Classification Search
CPC .............. Y02B 60/1292; Y02B 60/1242; G09G 3/001; G09G 1/3212; G06F 1/3265; G06F 1/3212
See application file for complete search history.

(56) References Cited

U.S. PATENT DOCUMENTS 4,295,135 A * 10/1981 Sukonick ............... G01R 13/30
                                                        345/641
4,839,641 A *  6/1989 Mori ................... H04W 88/023
                                                        340/7.35
(Continued)

FOREIGN PATENT DOCUMENTS

| CN | 1598767 | 3/2005 |
| EP | 0978780 | 2/2000 |
| WO | 03009272 | 1/2003 |

OTHER PUBLICATIONS

Office Action and Search Report received for Taiwanese Patent Application No. 101142036, dated Apr. 10, 2015, 15 pages including 8 pages English translation.
(Continued)

*Primary Examiner* — Devona Faulk
*Assistant Examiner* — Charles L Beard (57) ABSTRACT

Various embodiments are presented herein that may reduce the workload of a GPU tasked with delivering frames of video data to a display generated by a 3D application executing within a system or computing platform. 3D applications executing within the system may generate new frames of video content at a specified frame rate known as frames per second (FPS). These frames are then delivered to a display communicatively coupled with the system for rendering. Every display has a refresh rate specified in cycles per second or Hertz (Hz). Vertical Synchronization (VSYNC) is a setting that synchronizes the frames per second (FPS) of a given application with the display's refresh rate. Forcing VSYNC on the application while the system is operating on battery power may reduce the workload on the GPU when the FPS is greater than the refresh rate resulting in greater battery life.

16 Claims, 7 Drawing Sheets

(56) References Cited

U.S. PATENT DOCUMENTS

| | | | | |
|---|---|---|---|---|
| 5,230,084 A * | 7/1993 | Nguyen | | H04W 52/0229 340/7.34 |
| 5,423,045 A * | 6/1995 | Kannan et al. | | 713/322 |
| 5,808,693 A * | 9/1998 | Yamashita et al. | | 348/554 |
| 5,821,924 A * | 10/1998 | Kikinis | | G03G 15/2003 345/212 |
| 5,835,102 A * | 11/1998 | Monroe et al. | | 345/545 |
| 6,046,709 A * | 4/2000 | Shelton et al. | | 345/1.1 |
| 6,097,401 A * | 8/2000 | Owen et al. | | 345/562 |
| 6,118,430 A * | 9/2000 | Igari | | G09G 3/2007 345/157 |
| 6,144,362 A * | 11/2000 | Kawai | | H04N 21/4316 345/629 |
| 6,184,875 B1 * | 2/2001 | Matsuura | | G06F 1/3203 345/102 |
| 6,215,414 B1 * | 4/2001 | Kuramatsu | | H04W 88/026 340/7.2 |
| 6,469,744 B1 * | 10/2002 | Pearlstein | | 348/554 |
| 6,535,208 B1 * | 3/2003 | Saltchev | | G09G 5/12 345/211 |
| 6,658,575 B1 * | 12/2003 | Mizobuchi | | G06F 1/3203 713/300 |
| 6,747,654 B1 * | 6/2004 | Laksono et al. | | 345/502 |
| 6,772,236 B1 * | 8/2004 | Williams | | G06F 1/266 710/15 |
| 6,972,799 B1 * | 12/2005 | Hashimoto | | 348/350 |
| 7,456,833 B1 * | 11/2008 | Diard | | 345/440 |
| 7,522,167 B1 * | 4/2009 | Diard et al. | | 345/502 |
| 7,808,447 B1 * | 10/2010 | Cook | | G06F 3/1431 345/1.3 |
| 7,893,901 B2 * | 2/2011 | Kang | | G09G 3/3648 345/87 |
| 8,134,543 B1 * | 3/2012 | Han | | 345/204 |
| 8,212,830 B2 * | 7/2012 | Ogiso | | G06F 3/14 345/522 |
| 8,345,768 B1 * | 1/2013 | Hobbs et al. | | 375/240.24 |
| 8,363,044 B2 * | 1/2013 | Fletcher et al. | | 345/211 |
| 8,542,221 B1 * | 9/2013 | Wyatt | | G06F 15/00 345/204 |
| 8,610,732 B2 * | 12/2013 | Jacoby | | 345/543 |
| 8,621,253 B1 * | 12/2013 | Brown | | G06F 1/324 348/500 |
| 8,629,814 B2 * | 1/2014 | Teng | | G06F 1/1613 345/1.3 |
| 8,872,812 B2 * | 10/2014 | Greenberg et al. | | 345/419 |
| 8,878,859 B1 * | 11/2014 | van Scherrenburg | | 345/520 |
| 8,954,983 B2 * | 2/2015 | Stubbs | | G06F 1/329 713/322 |
| 9,378,536 B2 * | 6/2016 | Park | | G06T 1/20 |
| 9,589,540 B2 * | 3/2017 | Wu | | G06F 3/1407 |
| 9,804,661 B2 * | 10/2017 | Chae | | G06F 1/3265 |
| 9,905,199 B2 * | 2/2018 | Liu | | G09G 5/18 |
| 2001/0014950 A1 * | 8/2001 | Nishikawa | | 713/300 |
| 2001/0043266 A1 * | 11/2001 | Robinson et al. | | 348/53 |
| 2002/0021275 A1 * | 2/2002 | Kataoka et al. | | 345/102 |
| 2002/0075251 A1 * | 6/2002 | Millman | | G06F 1/3203 345/211 |
| 2002/0149598 A1 * | 10/2002 | Greier et al. | | 345/589 |
| 2002/0180725 A1 * | 12/2002 | Simmonds | | G09G 5/12 345/213 |
| 2003/0137521 A1 * | 7/2003 | Zehner et al. | | 345/589 |
| 2004/0062119 A1 * | 4/2004 | Stimak et al. | | 365/222 |
| 2004/0075653 A1 * | 4/2004 | Shiuan | | G09G 5/18 345/204 |
| 2004/0188640 A1 * | 9/2004 | Kanai | | 250/559.04 |
| 2005/0057690 A1 * | 3/2005 | Choi | | G09G 5/18 348/547 |
| 2005/0068311 A1 * | 3/2005 | Fletcher | | G06F 1/3218 345/211 |
| 2005/0086552 A1 * | 4/2005 | Matsubara | | G06F 1/3203 713/340 |
| 2005/0097376 A1 * | 5/2005 | Weinberger | | G06F 1/3203 713/320 |
| 2005/0125819 A1 * | 6/2005 | Ono et al. | | 725/14 |
| 2005/0140695 A1 * | 6/2005 | Dunton | | G06F 3/14 345/629 |
| 2005/0168458 A1 * | 8/2005 | Kang | | G09G 3/006 345/213 |
| 2005/0223249 A1 * | 10/2005 | Samson | | G06F 1/3228 713/320 |
| 2005/0264505 A1 * | 12/2005 | Kim | | 345/87 |
| 2006/0164438 A1 * | 7/2006 | Kuno | | G09G 5/14 345/629 |
| 2006/0176312 A1 * | 8/2006 | Kuno | | G09G 5/14 345/589 |
| 2006/0221067 A1 * | 10/2006 | Kim | | G06F 1/3203 345/204 |
| 2006/0222187 A1 * | 10/2006 | Jarrett | | H04R 3/002 381/92 |
| 2007/0008431 A1 * | 1/2007 | Englert | | H04N 5/265 348/600 |
| 2007/0171218 A1 * | 7/2007 | Hong et al. | | 345/211 |
| 2007/0183493 A1 * | 8/2007 | Kimpe | | G06F 21/6245 375/240.1 |
| 2007/0206018 A1 * | 9/2007 | Bajic | | G06F 1/3225 345/501 |
| 2007/0238440 A1 * | 10/2007 | Sengupta | | G06F 1/3209 455/343.2 |
| 2008/0055318 A1 * | 3/2008 | Glen | | 345/501 |
| 2008/0101096 A1 * | 5/2008 | Takayanagi | | H02J 7/0013 363/17 |
| 2008/0108396 A1 * | 5/2008 | Lundqvist | | H04W 52/0277 455/574 |
| 2008/0143728 A1 * | 6/2008 | Gorla et al. | | 345/501 |
| 2008/0143729 A1 * | 6/2008 | Wyatt et al. | | 345/501 |
| 2008/0192060 A1 * | 8/2008 | Ogiso | | G06F 3/14 345/546 |
| 2008/0200220 A1 * | 8/2008 | Jackson | | G06F 1/3203 455/574 |
| 2008/0238837 A1 * | 10/2008 | Yamaguchi | | 345/77 |
| 2008/0246438 A1 * | 10/2008 | Lu | | 320/137 |
| 2008/0303834 A1 * | 12/2008 | Swift | | G06T 1/20 345/522 |
| 2008/0303837 A1 * | 12/2008 | Swift | | G06F 9/5044 345/541 |
| 2008/0309652 A1 * | 12/2008 | Ostlund | | G09G 5/363 345/211 |
| 2009/0023482 A1 * | 1/2009 | Koura | | G09G 3/20 455/574 |
| 2009/0179923 A1 * | 7/2009 | Amundson et al. | | 345/690 |
| 2009/0225088 A1 * | 9/2009 | Aoki | | G09G 5/399 345/501 |
| 2009/0237391 A1 * | 9/2009 | Yanagi et al. | | 345/213 |
| 2009/0278830 A1 * | 11/2009 | Onishi | | G06F 1/3203 345/211 |
| 2010/0034024 A1 * | 2/2010 | Mochizuki et al. | | 365/185.18 |
| 2010/0111488 A1 * | 5/2010 | Chia-Chen | | 386/46 |
| 2010/0141762 A1 * | 6/2010 | Siann | | H04N 7/185 348/143 |
| 2010/0253803 A1 * | 10/2010 | Ise | | 348/222.1 |
| 2010/0277490 A1 * | 11/2010 | Nam | | G06F 3/147 345/581 |
| 2010/0306737 A1 * | 12/2010 | Hamilton, II | | G06F 8/73 717/110 |
| 2010/0315427 A1 * | 12/2010 | Wyatt | | G06F 3/14 345/502 |
| 2011/0074800 A1 * | 3/2011 | Stevens | | G06T 11/40 345/545 |
| 2011/0096079 A1 * | 4/2011 | Carter | | G06F 1/3265 345/520 |
| 2011/0109624 A1 * | 5/2011 | Greenberg et al. | | 345/419 |
| 2011/0115781 A1 * | 5/2011 | Park | | G09G 3/2096 345/211 |
| 2011/0134231 A1 * | 6/2011 | Hulvey | | H04N 13/0438 348/56 |
| 2011/0141355 A1 * | 6/2011 | Boak | | H04N 5/04 348/513 |
| 2011/0157191 A1 * | 6/2011 | Huang | | G06F 1/3203 345/503 |

(56) References Cited

U.S. PATENT DOCUMENTS

| | | | |
|---|---|---|---|
| 2011/0205433 A1* | 8/2011 | Altmann | 348/513 |
| 2011/0242116 A1* | 10/2011 | Nath et al. | 345/522 |
| 2011/0267377 A1* | 11/2011 | Kim et al. | 345/690 |
| 2012/0007875 A1* | 1/2012 | Sethuraman | G06F 3/1431 345/545 |
| 2012/0026137 A1* | 2/2012 | Park | G09G 3/2096 345/204 |
| 2012/0068993 A1* | 3/2012 | Kambhatla | G09G 5/00 345/213 |
| 2012/0104844 A1* | 5/2012 | Koiso | 307/9.1 |
| 2012/0207208 A1* | 8/2012 | Wyatt | G06F 3/14 375/240.01 |
| 2012/0249563 A1* | 10/2012 | Wyatt et al. | 345/522 |
| 2012/0293537 A1* | 11/2012 | Takami | G06F 21/84 345/589 |
| 2012/0308075 A1* | 12/2012 | Takenaka | G06F 21/10 382/100 |
| 2013/0021352 A1* | 1/2013 | Wyatt | G09G 5/395 345/520 |
| 2013/0027413 A1* | 1/2013 | Jayavant | G06F 1/325 345/520 |
| 2013/0176322 A1* | 7/2013 | Bakalash | G06T 15/005 345/522 |
| 2013/0235014 A1* | 9/2013 | Lee | G06F 1/32 345/211 |
| 2013/0337864 A1* | 12/2013 | Narayanan | G06F 9/54 455/552.1 |
| 2014/0082147 A1* | 3/2014 | Pazos | H04L 41/0896 709/219 |
| 2014/0104298 A1* | 4/2014 | Park | G09G 5/10 345/589 |
| 2014/0210832 A1* | 7/2014 | Wang | G09G 5/006 345/520 |
| 2014/0327811 A1* | 11/2014 | Kosaka | H04N 5/23212 348/353 |
| 2014/0354659 A1* | 12/2014 | Apodaca | G06F 15/76 345/522 |
| 2015/0118986 A1* | 4/2015 | Bartels | H04B 1/12 455/296 |
| 2015/0228244 A1* | 8/2015 | Wilson | H04N 7/0127 345/204 |
| 2015/0261284 A1* | 9/2015 | Lee | G06F 1/3234 713/323 |
| 2015/0301578 A1* | 10/2015 | Seo | G06F 1/3206 713/320 |
| 2015/0301587 A1* | 10/2015 | Chae | G06F 1/3265 713/323 |
| 2015/0348493 A1* | 12/2015 | Chae | G09G 5/00 345/212 |
| 2016/0054780 A1* | 2/2016 | Bodas | G06F 1/3203 713/320 |
| 2016/0088563 A1* | 3/2016 | Koo | H04W 52/0251 455/566 |
| 2016/0092010 A1* | 3/2016 | Agarwal | G06F 3/0412 345/173 |
| 2016/0127614 A1* | 5/2016 | Molnar | H04N 5/04 386/207 |
| 2016/0190863 A1* | 6/2016 | Ogasawara | G04G 19/00 368/47 |
| 2016/0209906 A1* | 7/2016 | Chae | G06F 1/3206 |
| 2016/0239065 A1* | 8/2016 | Lee | G06F 1/324 |
| 2016/0269168 A1* | 9/2016 | Carstens | A47G 29/141 |
| 2016/0300381 A1* | 10/2016 | Kim | G06T 1/60 |
| 2016/0358305 A1* | 12/2016 | Banerjee | G06T 1/20 |
| 2016/0358537 A1* | 12/2016 | Kang | G06T 1/20 |
| 2016/0360230 A1* | 12/2016 | Song | H04N 19/117 |
| 2017/0053620 A1* | 2/2017 | Law | G09G 5/363 |
| 2017/0060220 A1* | 3/2017 | Grossmann | G06F 1/3206 |
| 2017/0061568 A1* | 3/2017 | Metz | G06T 1/20 |
| 2017/0116938 A1* | 4/2017 | Li | G09G 3/3648 |
| 2017/0116939 A1* | 4/2017 | Li | G09G 3/3648 |
| 2017/0132746 A1* | 5/2017 | Wilt | G06T 1/20 |
| 2017/0132747 A1* | 5/2017 | Wilt | G06T 1/20 |
| 2017/0212563 A1* | 7/2017 | Farazmand | G06F 1/32 |
| 2017/0221457 A1* | 8/2017 | Huang | G09G 5/395 |
| 2017/0235357 A1* | 8/2017 | Leung | G06F 1/3212 713/310 |
| 2017/0263212 A1* | 9/2017 | Chae | G09G 5/30 |
| 2017/0300108 A1* | 10/2017 | Yang | G06F 1/28 |
| 2017/0318209 A1* | 11/2017 | Miyakawa | H04N 5/2258 |
| 2017/0322612 A1* | 11/2017 | Beuchat | G06F 1/324 |
| 2017/0371394 A1* | 12/2017 | Chan | G06F 1/3218 |
| 2018/0077409 A1* | 3/2018 | Heo | H04N 13/122 |
| 2018/0086215 A1* | 3/2018 | Yoo | B60L 11/1857 |

OTHER PUBLICATIONS

Extended European Search Report received for European Patent Application No. 11876738.3, dated Jun. 3, 2015, 7 pages.

International Search Report and Written Opinion dated Jul. 30, 2012 for corresponding PCT/US2011/062612 filed Nov. 30, 2011 (nine (9) pages).

Office Action and Search Report received for Chinese Patent Application No. 201180075160.7, dated Sep. 30, 2015, 8 pages (untranslated).

* cited by examiner

REDUCING POWER FOR 3D WORKLOADS

BACKGROUND

Computing platforms are generally capable of operating on a direct power source or on battery power when a direct power source is unavailable. Battery power is naturally a finite resource and must be recharged periodically. Considerable thought has gone into methods and techniques for extending the operating time of a computing platform while operating on battery power. Many computing platforms utilize both central processing units (CPUs) and graphics processing units (GPUs) within an overall system. One technique for reducing overall system power consumption and extending battery life is to reduce the frequencies at which the CPU and GPU operate while on battery power. This technique does not necessarily reduce the amount of work performed by the CPU or GPU—rather it slows down the pace at which the work is done. Another approach may be to reduce the actual workload associated with an application executing on either the CPU or GPU. Accordingly, there may be a need for improved techniques to solve these and other problems.

DETAILED DESCRIPTION

Various embodiments are presented herein that may reduce the workload of a GPU tasked with delivering frames of video data to a display generated by a three dimensional (3D) application executing within a system or computing platform. 3D applications executing within the system may generate new frames of video content at a specified frame rate known as frames per second (FPS). The GPU may be responsible for actually generating the frames. These frames are then delivered to a display communicatively coupled with the system for rendering. Every display has a refresh rate specified in cycles per second or Hertz (Hz). The refresh rate refers to the number of times the display can render a frame each second. A 60 Hz refresh rate means that the display can render 60 FPS.

VSYNC stands for Vertical Synchronization. VSYNC is a setting that synchronizes the frames per second (FPS) of a given application with the display's refresh rate. When VSYNC is disabled, the frames per second (FPS) utilized by a given application and refresh rate of the display have no relationship to each other as such. This lets the GPU work as fast as it wants, sending frames to the display as fast as it can draw them. Whether the display can actually show all these frames properly or not is another matter. For example, a 60 Hz display that is receiving video from an application operating at 120 FPS may display only 60 frames at most during any given second. The other 60 frames the GPU is producing are not being displayed and are wasted. Forcing VSYNC on the application while the system is operating on battery power may reduce the workload on the GPU. The GPU may not be required to generate as many frames as the application specifies if the refresh rate of the display cannot handle the FPS setting of the application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
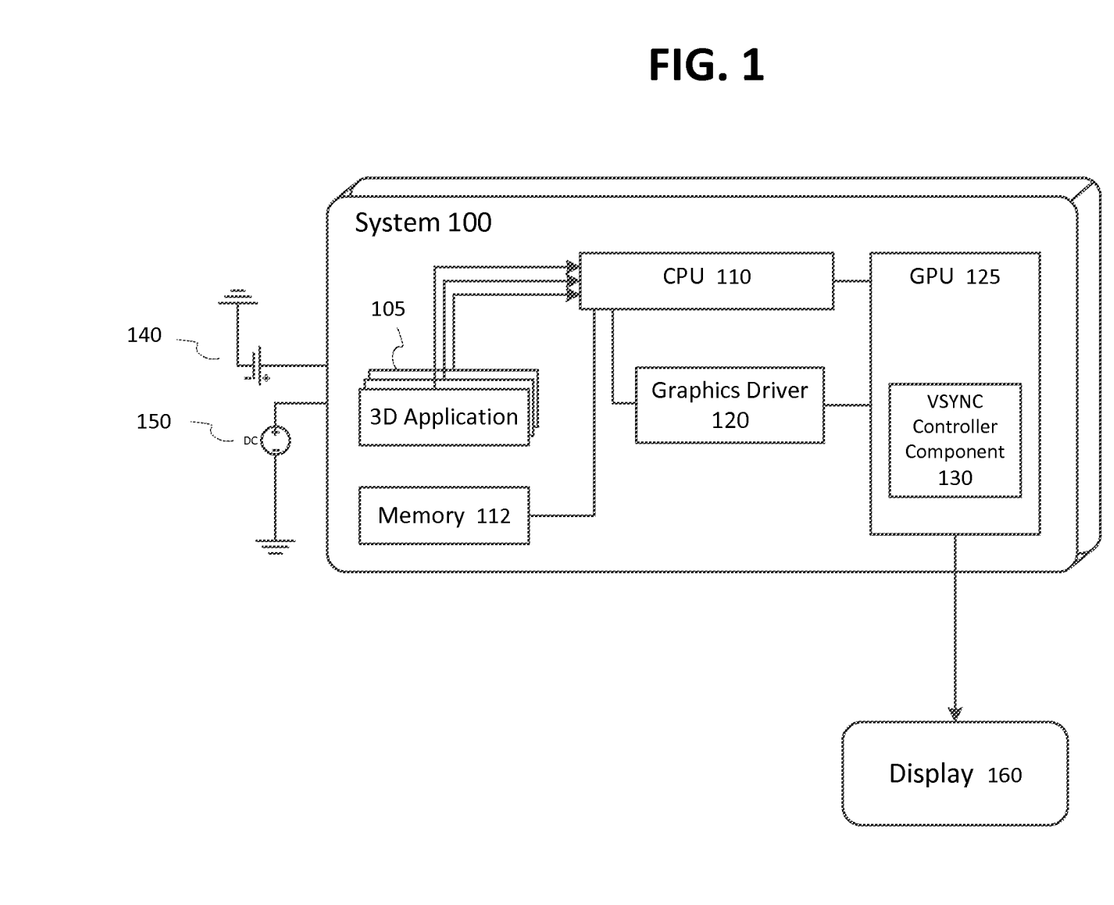
FIG. 1 illustrates a block diagram of an architecture suitable for carrying out embodiments of the invention.

FIG. 1 illustrates a system 100 implementing an exemplary computing platform. The system 100 may include a processor circuit denoted as CPU 110, a second processor circuit denoted as GPU 125, and memory 112. One or more 3D applications 105 may be executing under the control and supervision of the CPU 110. The system 100 may further include a graphics driver 120 operative on CPU 110. There may be an instance of the graphics driver 120 associated with each 3D application 105. Each 3D application 105 may create a 3D context (e.g., a GPU state). The graphics driver 120 may be operative to enable a VSYNC setting to control the FPS that the GPU generates for a given 3D application. The GPU 125 may also include a VSYNC controller component 130 operative to enforce the VSYNC setting to synchronize the FPS of a 3D application to the refresh rate of a display 160.

The system 100 may be powered by either an external direct current (DC) source 150 or a battery 140. The graphics driver 120 may be operative to determine whether the system 100 is being powered by the external DC source 150 or the battery 140. The system 100 may also be communicatively coupled with the display 160. The display 160 may be associated with one or more refresh rates that control how often the display 160 refreshes its screen with a new frame. The display 160 may receive frames from the GPU 125 at a frame rate specified by the 3D application. A 3D application 105 may provide for one or more different frame rates during execution and may also include a setting for VSYNC in which the frame rate will be synced to the refresh rate of the display 160.

Figure 2:
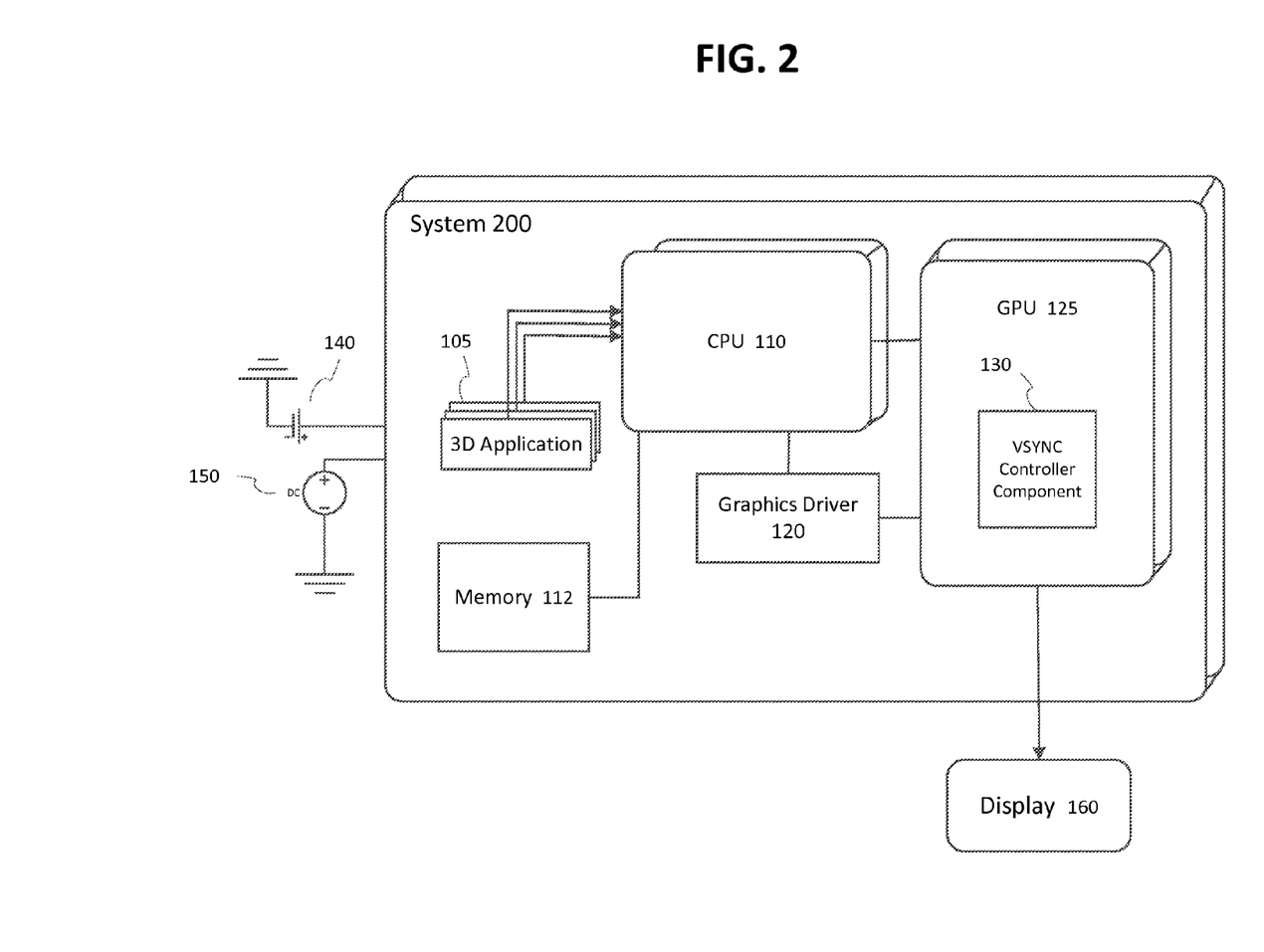
FIG. 2 illustrates another block diagram of an architecture suitable for carrying out embodiments of the invention.

The system 100 of FIG. 1 has been illustrated as integrated into a single platform. For instance, the CPU 110 and GPU 125 may be on the same processor die. Another embodiment is illustrated in FIG. 2 in which the CPU 110 and the GPU 125 are not necessarily on the same processor die. The GPU 125 may be, for instance, a separate graphics processing card communicatively coupled with the CPU 110.

The system 200 of FIG. 2 generally operates similar to the system 100 of FIG. 1. One or more 3D applications 105 may be executing under the control of the CPU 110 and memory 112. The graphics driver 120 may include separate instances for each of the 3D applications 105. Each 3D application 105 may create a 3D context (e.g., a GPU state). The graphics driver 120 may be operative to enable a VSYNC setting to control the FPS that the GPU generates for a given 3D application. The GPU 125 may also include a VSYNC controller component 130 operative to enforce the VSYNC setting to synchronize the FPS of a 3D application to the refresh rate of a display 160.

The system 200 may be powered by either an external DC source 150 or a battery 140. The graphics driver 120 may be operative to determine whether the system 200 is being powered by the external DC source 150 or the battery 140. The system 200 may also be communicatively coupled with the display 160. The display 160 may be associated with one or more refresh rates that control how often the display 160 refreshes its screen with a new frame. The display 160 may receive frames from the GPU 125 at a frame rate specified by the 3D application. A 3D application 105 may provide for one or more different frame rates during execution and may also include a setting for VSYNC in which the frame rate will be synced to the refresh rate of the display 160.

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
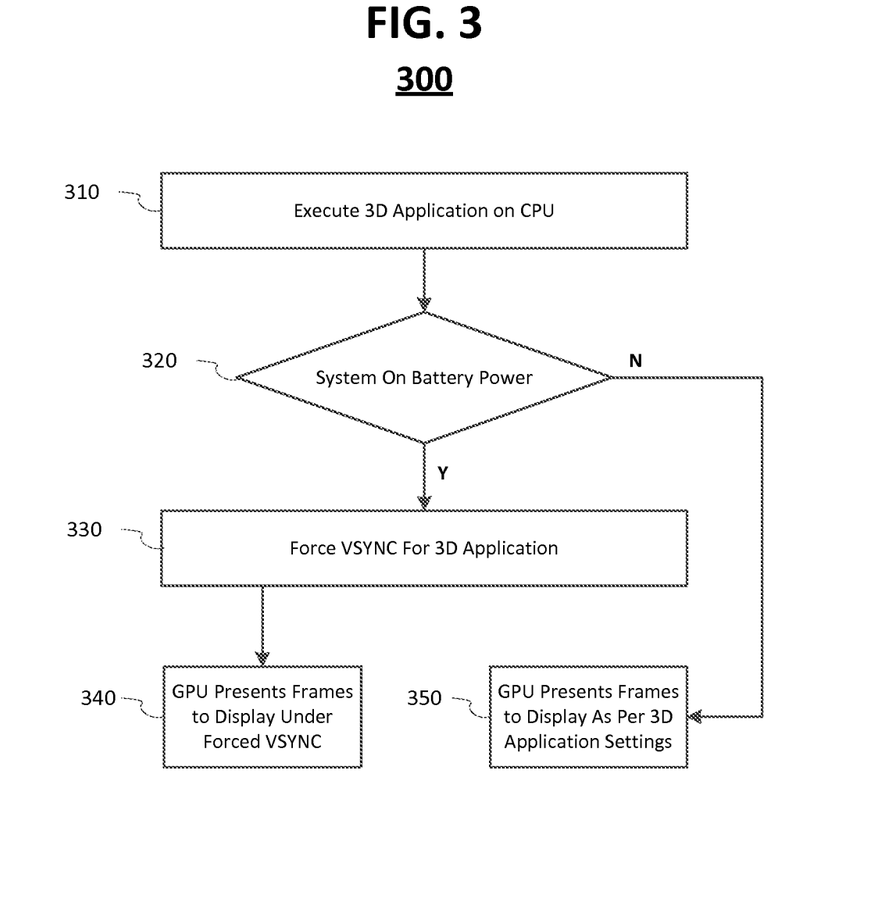
FIG. 3 illustrates one embodiment of a logic flow.

FIG. 3 illustrates one embodiment of a logic flow 500 in which battery power is conserved by reducing the workload of the GPU 125 according to embodiments of the invention. The logic flow 300 may be representative of some or all of the operations executed by one or more embodiments described herein.

The illustrated embodiment shown in FIG. 3 may reduce the workload of a GPU tasked with delivering frames of video data to a display generated by a 3D application executing within a system or computing platform. 3D applications executing within the system may generate new frames of video content at a specified frame rate or FPS. The system 100 may include a CPU 110 and a GPU 125. One or more 3D applications 105 may be executing under the control and supervision of the CPU 110. The system 100 may further include a graphics driver 120 operative on CPU 110. There may be an instance of the graphics driver 120 associated with each 3D application 105. Each 3D application 105 may create a 3D context (e.g., a GPU state). The graphics driver 120 may be operative to determine when the system 100 is operating on battery power 140. The graphics driver 120 may be operative to enable a VSYNC setting to control the FPS that the GPU generates for a given 3D application. When the system 100 is operating on battery power 140, the graphics driver 120 may force VSYNC on the 3D application 105. A 3D application 105 may provide for one or more different frame rates during execution and may also include a setting for VSYNC in which the frame rate will be synced to the refresh rate of the display 160. The GPU 125 may also include a VSYNC controller component 130 operative to enforce the VSYNC setting to synchronize the FPS of a 3D application 105 to the refresh rate of a display 160. The system 100 may also be communicatively coupled with the display 160.

In the illustrated embodiment shown in FIG. 3, the CPU 110 may be executing a 3D application 105 at block 310. For example, one or more 3D applications 105 may be executing on the system 100 under the control of CPU 110. Each 3D application 105 may be associated with an instance of the graphics driver 120. Under normal operating conditions, the 3D application(s) will execute according to the settings specified within the given 3D application 105. The embodiments are not limited in this context.

The logic flow 300 may determine whether the system 100 is operating on battery power 140 at block 320. For example, the system 100 may be operative on battery power 140 or may receive power from an external DC source 150. An external DC source 150 may be representative of the system being plugged in to an alternating current (AC) outlet. The power from the AC outlet may pass through a rectifier that converts it to DC for operating the system 100. When the system 100 is receiving power from an external DC source 150, power consumption is less of an issue. However, when the system 100 is receiving power from a battery 140, power consumption is an issue because the charge in the battery 140 is limited and dwindles with system 100 use. The graphics driver 120 may be capable of determining when the system 100 is operating on battery power 140. In such cases, certain power savings techniques may be implemented to extend the life of the battery while powering the system 100. The embodiments are not limited in this context.

The logic flow 300 may force execution of the VSYNC setting when the system 100 is operating on battery power 140 at block 330. For example, an instance of the graphics driver 120 may be associated with a 3D application 105. The graphics driver 120 may have determined that the system 100 is operating on battery power 140. In an effort to conserve power while operating on battery power 140, the graphics driver 120 may enable or force VSYNC between the 3D application 105 and the display 160. The graphics driver 120 signals the GPU 125 to lower the frame rate to match the refresh rate of the display 160. The embodiments are not limited in this context.

The GPU 125 may present frames to the display 160 at block 340. For example, the GPU 125 generates frames of video content for the display 160. If the system 100 is operating on battery power 140, the GPU 125 may present the frames to the display 160 under VSYNC. The FPS for the 3D application 105 will be forced into VSYNC to match the refresh rate of the display 160. Consider a 3D application 105 operating with a frame rate of 90 FPS. The display 160 may have a refresh rate of 75 Hz. In this example, VSYNC will cap the GPU 125 workload at 75 FPS rather than 90. Since the GPU 125 does not have to generate the additional 15 frames its workload has been reduced thereby conserving power. The embodiments are not limited in this context.

The GPU 125 may present frames to the display 160 at block 350. For example, the GPU 125 generates frames of video content for the display 160. If the system 100 is operating on power form an external DC source 150 that is not the battery 140, the GPU 125 may present the frames to the display 160 as intended by the 3D application 105. The embodiments are not limited in this context.

Figure 4:
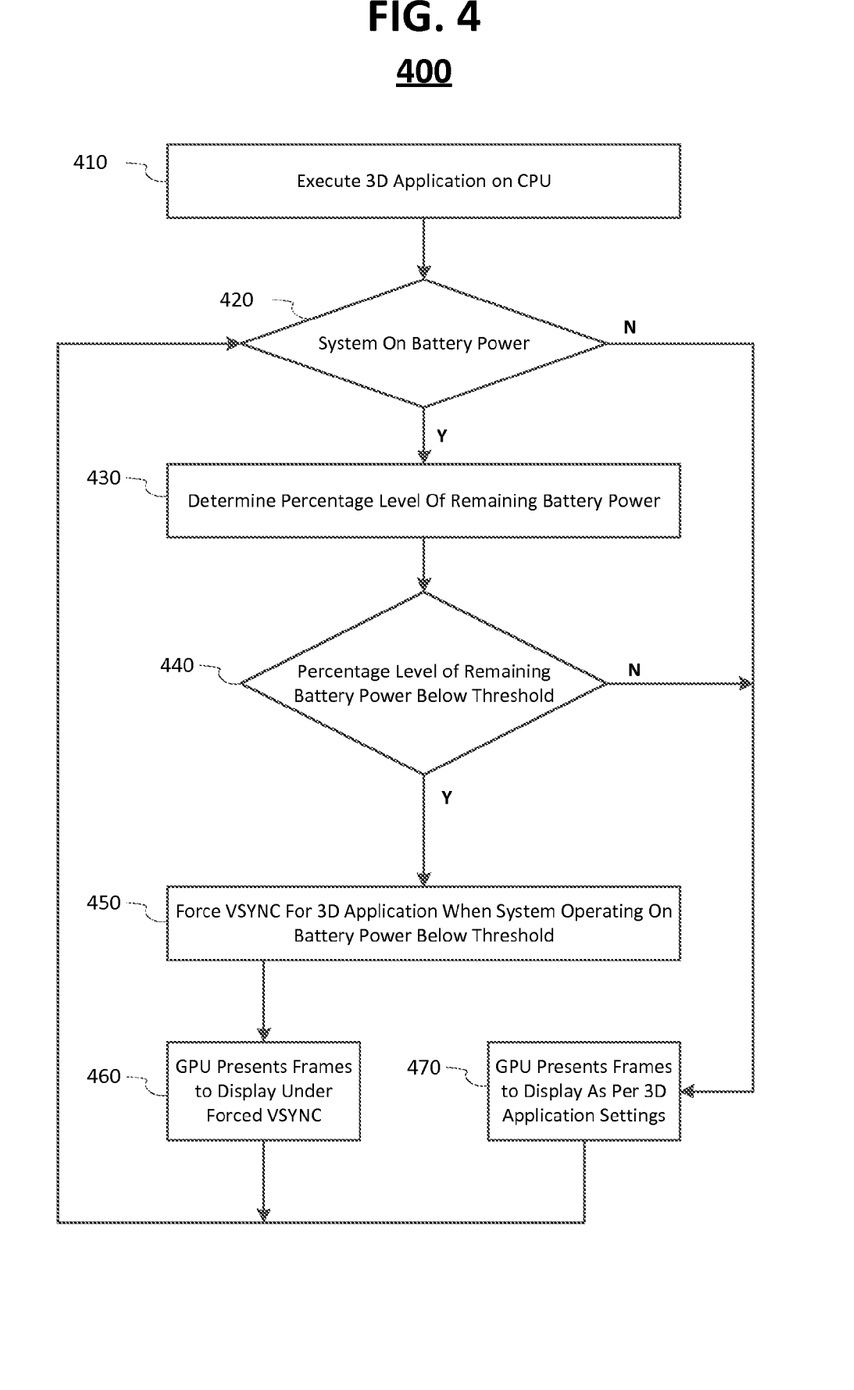
FIG. 4 illustrates one embodiment of a logic flow.

FIG. 4 illustrates another embodiment of a logic flow 400 in which battery power is conserved by reducing the workload of the GPU 125 according to embodiments of the invention. The logic flow 400 may be representative of some or all of the operations executed by one or more embodiments described herein.

The illustrated embodiment shown in FIG. 4 may reduce the workload of a GPU tasked with delivering frames of video data to a display generated by a 3D application executing within a system or computing platform. 3D applications executing within the system may generate new frames of video content at a specified frame rate or FPS. The system 100 may include a CPU 110 and a GPU 125. One or more 3D applications 105 may be executing under the control and supervision of the CPU 110. The system 100 may further include a graphics driver 120 operative on CPU 110. There may be an instance of the graphics driver 120 associated with each 3D application 105. Each 3D application 105 may create a 3D context (e.g., a GPU state). The graphics driver 120 may be operative to determine when the system 100 is operating on battery power 140 and how much of the battery power remains. The graphics driver 120 may be operative to enable a VSYNC setting to control the FPS that the GPU generates for a given 3D application when the battery power remaining falls below a threshold level. When the system 100 is operating on battery power 140, the graphics driver 120 may force VSYNC on the 3D application 105. A 3D application 105 may provide for one or more different frame rates during execution and may also include a setting for VSYNC in which the frame rate will be synced to the refresh rate of the display 160. The GPU 125 may also include a VSYNC controller component 130 operative to enforce the VSYNC setting to synchronize the FPS of a 3D application to the refresh rate of a display 160. The system 100 may also be communicatively coupled with the display 160.

In the illustrated embodiment shown in FIG. 4, the CPU 110 may be executing a 3D application 105 at block 410. For example, one or more 3D applications 105 may be executing on the system 100 under the control of CPU 110. Each 3D application 105 may be associated with an instance of the graphics driver 120. Under normal operating conditions, the 3D application(s) will execute according to the settings specified within the given 3D application 105. The embodiments are not limited in this context.

The logic flow 400 may determine whether the system 100 is operating on battery power 140 at block 420. For example, the system 100 may be operative on battery power 140 or may receive power from an external DC source 150. An external DC source 150 may be representative of the system being plugged in to an alternating current (AC) outlet. The power from the AC outlet may pass through a rectifier that converts it to DC for operating the system 100. When the system 100 is receiving power from an external DC source 150, power consumption is less of an issue. However, when the system 100 is receiving of power from a battery 140, power consumption is an issue because the charge in the battery 140 is limited and dwindles with system 100 use. The graphics driver 120 may be capable of determining when the system 100 is operating on battery power 140. In such cases, certain power savings techniques may be implemented to extend the life of the battery while powering the system 100. The embodiments are not limited in this context.

In the illustrated embodiment shown in FIG. 4, the logic flow 400 may determine a percentage level of remaining battery power 140 at block 430. For example, the graphics driver 120 may be operative to determine how much battery power 140 remains at a given time. The embodiments are not limited in this context.

In the illustrated embodiment shown in FIG. 4, the logic flow 400 may determine whether the percentage level of remaining battery power 140 has dipped below a threshold at block 440. For example, the graphics driver 120 may be operative to determine how much battery power 140 remains at a given time and compare it to a threshold level. The system may be set to invoke power savings once the battery dips below a pre-defined threshold level rather than automatically conserve power upon detection of battery power 140. The embodiments are not limited in this context.

In the illustrated embodiment shown in FIG. 4, the graphics driver 120 may force execution of the VSYNC setting when the system 100 is operating on battery power 140 below a threshold level at block 450. For example, an instance of the graphics driver 120 may be associated with a 3D application 105. The graphics driver 120 may have determined that the system 100 is operating on battery power 140 and that the battery power has dipped below a pre-defined threshold level. In an effort to conserve power while operating on battery power 140, the graphics driver 120 instance for a given 3D application 105 may then enable or force VSYNC between the 3D application 105 and the display 160. The graphics driver 120 signals the GPU 125 to lower the frame rate to match the refresh rate of the display 160. The embodiments are not limited in this context.

The GPU 125 may present frames to the display 160 at block 460. For example, the GPU 125 generates frames of video content for the display 160. If the system 100 is operating on battery power 140 below a threshold level, the GPU 125 may present the frames to the display 160 under VSYNC. The FPS for the 3D application 105 will be forced into VSYNC to match the refresh rate of the display 160. Consider a 3D application 105 operating with a frame rate of 90 FPS. The display 160 may have a refresh rate of 75 Hz. In this example, VSYNC will cap the GPU 125 workload at 75 FPS rather than 90. Since the GPU 125 does not have to generate the additional 15 frames its workload has been reduced thereby conserving power. The embodiments are not limited in this context.

The GPU 125 may present frames to the display 160 at block 470. For example, the GPU 125 generates frames of video content for the display 160. If the system 100 is operating on power form a external DC source 150 that is not the battery 140 or if the system 100 is operating on battery power 140 but above a threshold level, the GPU 125 may present the frames to the display 160 as intended by the 3D application 105. The embodiments are not limited in this context.

Figure 5:
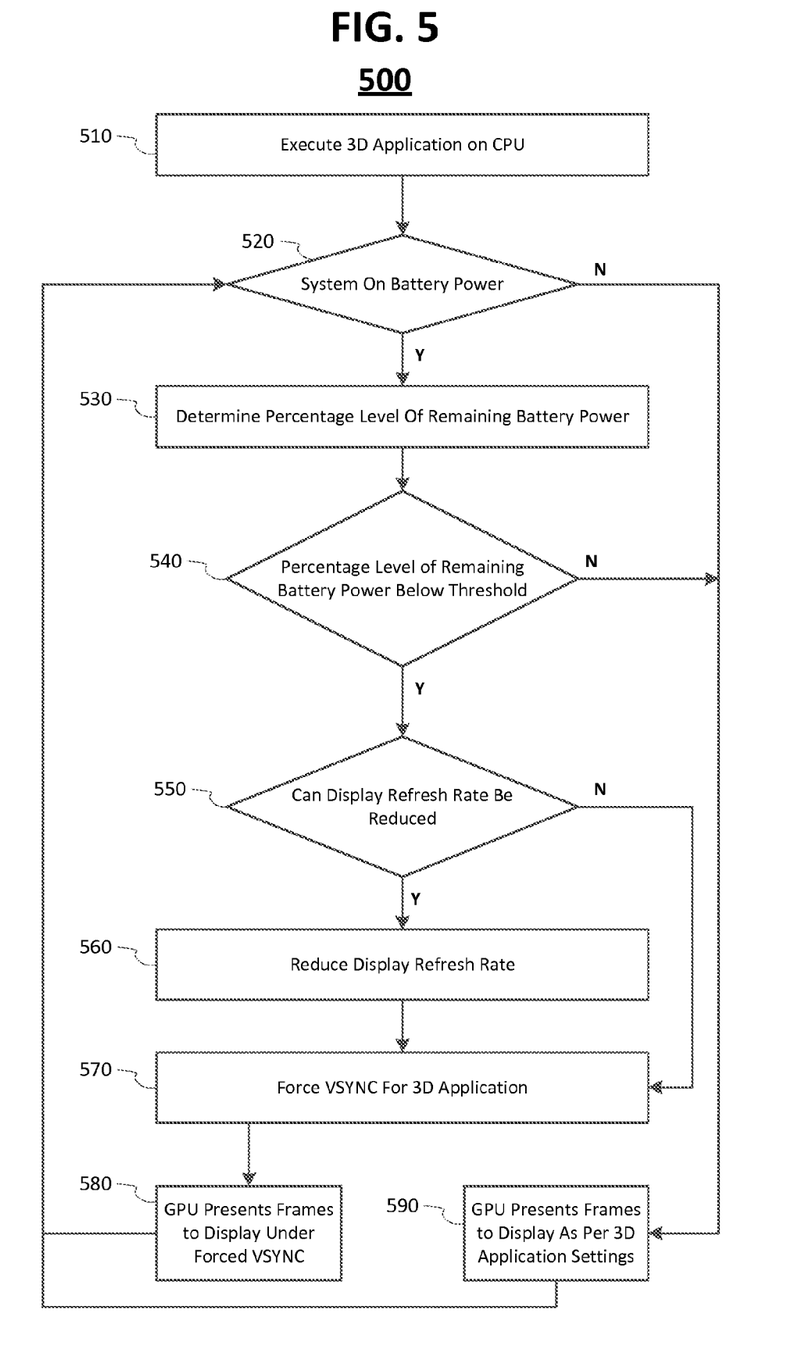
FIG. 5 illustrates one embodiment of a logic flow.

FIG. 5 illustrates one embodiment of a logic flow 500 in which battery power is conserved by reducing the workload of the GPU 125 according to embodiments of the invention. The logic flow 500 may be representative of some or all of the operations executed by one or more embodiments described herein.

The illustrated embodiment shown in FIG. 5 may reduce the workload of a GPU tasked with delivering frames of video data to a display generated by a 3D application executing within a system or computing platform. 3D applications executing within the system may generate new frames of video content at a specified frame rate or FPS. The system 100 may include a CPU 110 and a GPU 125. One or more 3D applications 105 may be executing under the control and supervision of the CPU 110. The system 100 may further include a graphics driver 120 operative on CPU 110. There may be an instance of the graphics driver 120 associated with each 3D application 105. Each 3D application 105 may create a 3D context (e.g., a GPU state). The graphics driver 120 may be operative to determine when the system 100 is operating on battery power 140 and how much of the battery power remains. The graphics driver 120 may be operative to enable a VSYNC setting to control the FPS that the GPU generates for a given 3D application when the battery power remaining falls below a threshold level. When the system 100 is operating on battery power 140, the graphics driver 120 may force VSYNC on the 3D application 105. A 3D application 105 may provide for one or more different frame rates during execution and may also include a setting for VSYNC in which the frame rate will be synced to the refresh rate of the display 160. The GPU 125 may also include a VSYNC controller component 130 operative to enforce the VSYNC setting to synchronize the FPS of a 3D application to the refresh rate of a display 160. The system 100 may also be communicatively coupled with the display 160. The display 160 may be associated with one or more refresh rates that control how often the display 160 refreshes its screen with a new frame. The system 100 may be able to lower the refresh rate of the display if there is a lower supportable setting available. Lowering the refresh rate of the display prior to forcing VSYNC may conserve even more battery power since the FPS required of the 3D application ay be even further reduced.

In the illustrated embodiment shown in FIG. 5, the CPU 110 may be executing a 3D application 105 at block 510. For example, one or more 3D applications 105 may be executing on the system 100 under the control of CPU 110. Each 3D application 105 may be associated with an instance of the graphics driver 120. Under normal operating conditions, the 3D application(s) will execute according to the settings specified within the given 3D application 105. The embodiments are not limited in this context.

The logic flow 500 may determine whether the system 100 is operating on battery power 140 at block 520. For example, the system 100 may be operative on battery power 140 or may receive power from an external DC source 150. An external DC source 150 may be representative of the system being plugged in to an alternating current (AC) outlet. The power from the AC outlet may pass through a rectifier that converts it to DC for operating the system 100. When the system 100 is receiving power from an external DC source 150, power consumption is less of an issue. However, when the system 100 is receiving power from a battery 140, power consumption is an issue because the charge in the battery 140 is limited and dwindles with system 100 use. The graphics driver 120 may be capable of determining when the system 100 is operating on battery power 140. In such cases, certain power savings techniques may be implemented to extend the life of the battery while powering the system 100. The embodiments are not limited in this context.

In the illustrated embodiment shown in FIG. 5, the logic flow 500 may determine a percentage level of remaining battery power 140 at block 530. For example, the graphics driver 120 may be operative to determine how much battery power 140 remains at a given time. The embodiments are not limited in this context.

In the illustrated embodiment shown in FIG. 5, the graphics driver 120 may determine whether the percentage level of remaining battery power 140 has dipped below a threshold at block 540. For example, the graphics driver 120 may be operative to determine how much battery power 140 remains at a given time and compare it to a threshold level. The system may be set to invoke power savings once the battery dips below a pre-defined threshold level rather than automatically conserve power upon detection of battery power 140. The embodiments are not limited in this context.

In the illustrated embodiment shown in FIG. 5, the logic flow 500 may determine whether the refresh rate for the display 160 can be reduced at block 550. For example, some displays may support multiple different refresh rates. The display 160 may be operating at a refresh rate of 75 Hz but may also be operable at a refresh rate of 60 Hz. The embodiments are not limited in this context.

In the illustrated embodiment shown in FIG. 5, the logic flow 500 may reduce the refresh rate of the display 160 at block 560. For example, if the display supports a lower refresh rate the system 100 may be able to instruct the display 160 to operate at a lower refresh rate than that which it is currently operating. In the example above, the refresh rate for the display may be reduced from 75 Hz to 60 Hz. The embodiments are not limited in this context.

In the illustrated embodiment shown in FIG. 5, the graphics driver 120 may force execution of the VSYNC setting when the system 100 is operating on battery power 140 below a threshold level at block 570. For example, an instance of the graphics driver 120 may be associated with a 3D application 105. The graphics driver 120 may have determined that the system 100 is operating on battery power 140 and that the battery power has dipped below a pre-defined threshold level. In an effort to conserve power while operating on battery power 140, the graphics driver 120 instance for a given 3D application 105 may enable or force VSYNC between the 3D application 105 and the display 160. The graphics driver 120 signals the GPU 125 to lower the frame rate to match the refresh rate of the display 160. The embodiments are not limited in this context.

The GPU 125 may present frames to the display 160 at block 580. For example, the GPU 125 generates frames of video content for the display 160. If the system 100 is operating on battery power 140 below a threshold level, the GPU 125 may present the frames to the display 160 under VSYNC. The FPS for the 3D application 105 will be forced into VSYNC to match the refresh rate of the display 160. Consider a 3D application 105 operating with a frame rate of 90 FPS. The display 160 may have a refresh rate of 75 Hz. The refresh rate may have been reduced to 60 Hz at block 560 above. In this example, VSYNC will cap the GPU 125 workload at 60 FPS rather than 90. Since the GPU 125 does not have to generate the additional 30 frames its workload has been even further reduced thereby conserving power and further extending the life of the battery 140. The embodiments are not limited in this context.

The GPU 125 may present frames to the display 160 at block 590. For example, the GPU 125 generates frames of video content for the display 160. If the system 100 is operating on power form a external DC source 150 that is not the battery 140 or if the system 100 is operating on battery power 140 but above a threshold level, the GPU 125 may present the frames to the display 160 as intended by the 3D application 105. In this case, the FPS may be set to 90 by the 3D application 105. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 6:
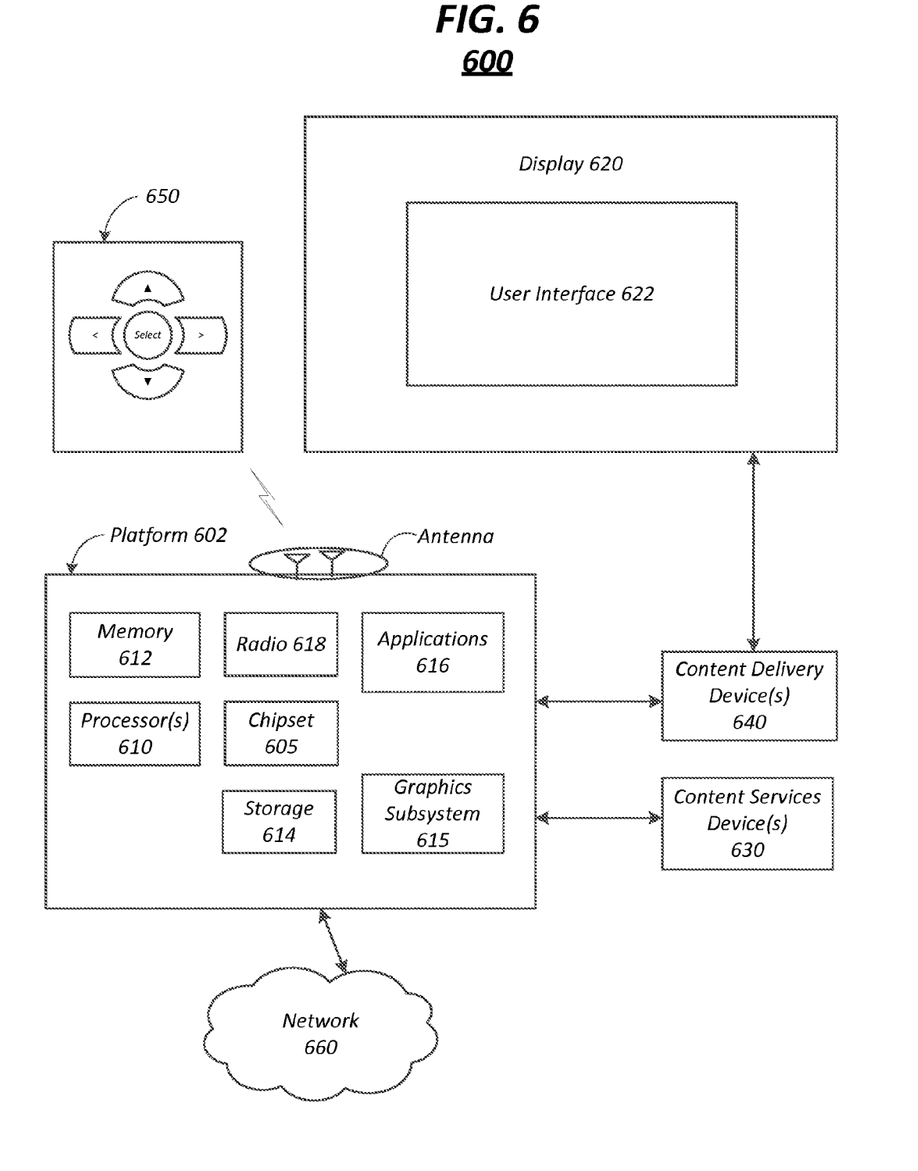
FIG. 6 illustrates an embodiment of a system that may be suitable for implementing embodiments of the disclosure.

FIG. 6 illustrates an embodiment of a system 600 that may be suitable for implementing the forced VSYNC processing embodiments of the disclosure. In embodiments, system 600 may be a system capable of forcing VSYNC although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor(s) 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor(s) 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
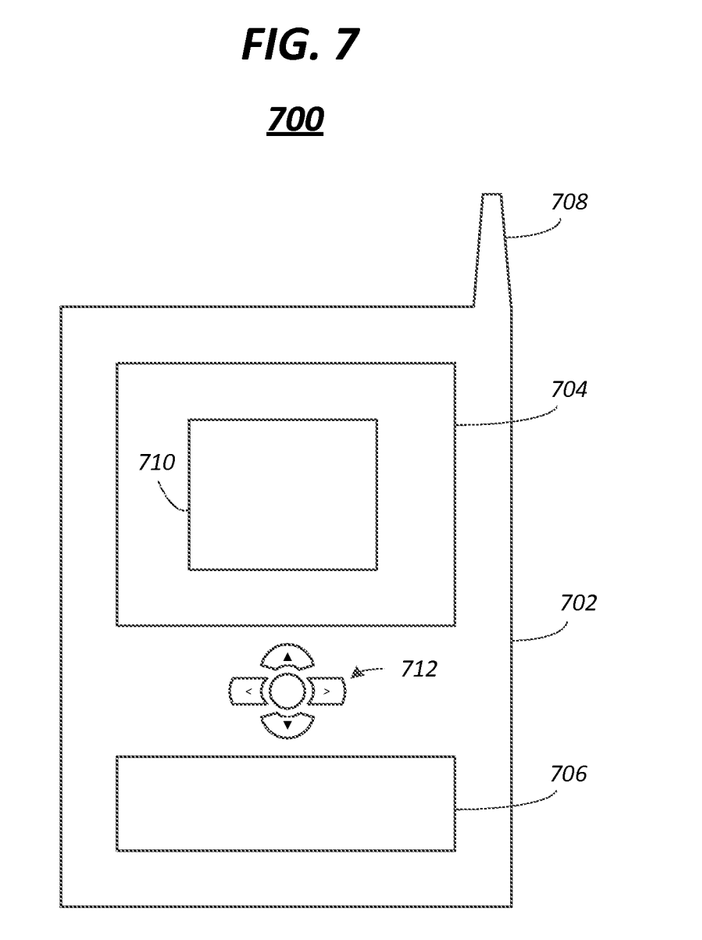
FIG. 7 illustrates embodiments of a small form factor device in which the system of FIG. 6 may be embodied.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
a processor circuit; and
a graphics driver operative on the processor circuit to:
execute an application having a three dimensional (3D) workload;
determine, prior to enablement of a vertical synchronization (VSYNC) setting, whether a display supports a lower refresh rate than a current refresh rate;
instruct the display to operate at the lower refresh rate if the display supports the lower refresh rate;
enable the VSYNC setting responsive to the processor circuit operating on battery power and while a percentage level of remaining battery power is lower than a threshold percentage level, the VSYNC setting to enable VSYNC operations to synchronize a frames per second (FPS) specified by the application with the current refresh rate for a display, and
enforce the VSYNC setting within the application to synchronize the FPS of the application with the current refresh rate for the display, the graphics driver operative to return VSYNC control to the application when the processor circuit is not operating on battery power.

2. The apparatus of claim 1, the graphics driver operative to determine when the processor circuit is operating on battery power.

3. The apparatus of claim 2, the graphics driver operative to determine the threshold percentage level of remaining battery power.

4. The apparatus of claim 1, the graphics driver operative to override the VSYNC setting within the application to enable the VSYNC operations while the processor circuit is operating on battery power.

5. The apparatus of claim 1 comprising a battery operative to power the processor circuit.

6. The apparatus of claim 1, the graphics driver operative to lower the refresh rate of the display prior to enabling the VSYNC setting.

7. The apparatus of claim 1 comprising a second processor circuit communicatively coupled to the processor circuit, the second processor circuit operative to present frames for rendering on the display.

8. The apparatus of claim 7, the processor circuit comprising a central processing unit (CPU), the second processor circuit comprising a graphics processing unit (GPU), and further comprising a display communicatively coupled with the GPU.

9. A method, comprising:
 executing an application having a 3D workload on a central processing unit (CPU);
 determining, prior to enablement of a vertical synchronization (VSYNC) setting, whether a display supports a lower refresh rate than a current refresh rate;
 instructing the display to operate at the lower refresh rate if the display supports the lower refresh rate;
 enabling the VSYNC setting responsive to the CPU operating on battery power and while a percentage level of remaining battery power is lower than a threshold percentage level, the VSYNC setting enabling VSYNC operations to synchronize a frames per second (FPS) specified by the application with the current refresh rate for a display, enabling the VSYNC operations comprising enforcing a VSYNC setting within the application to synchronize the FPS specified by the application with the current refresh rate for the display, returning VSYNC control to the application when the CPU is not operating on battery power;
 executing VSYNC operations on a graphics processing unit (GPU); and
 presenting frames for rendering to the display.

10. The method of claim 9, comprising:
 determining the percentage level of remaining battery power while the CPU is operating on battery power.

11. The method of claim 9, comprising:
 overriding the VSYNC setting within the application to enable the VSYNC operations when the CPU is operating on battery power.

12. The method of claim 9, comprising:
 lowering the refresh rate of the display prior to executing the VSYNC operations.

13. An article of manufacture comprising a non-transitory computer-readable storage medium containing instructions that when executed cause a system to:
 execute an application having a 3D workload on a central processing unit (CPU);
 determine, prior to enablement of a vertical synchronization (VSYNC) setting, whether a display supports a lower refresh rate than a current refresh rate;
 instruct the display to operate at the lower refresh rate if the display supports the lower refresh rate;
 enable the VSYNC setting responsive to the CPU operating on battery power and while a percentage level of remaining battery power is lower than a threshold percentage level, the VSYNC setting enabling VSYNC operations to synchronize a frames per second (FPS) specified by the application with the current refresh rate for the display, return VSYNC control to the application when the system is not operating on battery power;
 execute the VSYNC operations on a graphics processing unit (GPU); and
 present frames for rendering to the display.

14. The article of claim 13 containing instructions that when executed cause a system to:
 determine the percentage level of remaining battery power while the CPU is operating on battery power.

15. The article of claim 13 containing instructions that when executed cause a system to:
 override the VSYNC setting within the application to enable the VSYNC function while the system is operating on battery power.

16. The article of claim 13 containing instructions that when executed cause a system to:
 lower the refresh rate of the display prior to executing the VSYNC function.

* * * * *

UNITED STATES PATENT AND TRADEMARK OFFICE
CERTIFICATE OF CORRECTION

PATENT NO. : 10,134,314 B2
APPLICATION NO. : 13/976012
DATED : November 20, 2018
INVENTOR(S) : Michael Apodaca Page 1 of 1

It is certified that error appears in the above-identified patent and that said Letters Patent is hereby corrected as shown below:

In the Claims

Column 16, Claim 15, Line 4, Please replace "the VSYNC function" with "a VSYNC function"

Column 16, Claim 16, Line 4, Please replace "the VSYNC function" with "a VSYNC function"

Signed and Sealed this
Thirtieth Day of April, 2019

Andrei Iancu
*Director of the United States Patent and Trademark Office*